Patented Oct. 27, 1936

2,058,435

UNITED STATES PATENT OFFICE 2,058,435

METHOD OF DEHYDRATING PYRIDINE AND ITS HOMOLOGUES

Webster E. Fisher, Rochester, N. Y., assignor, by mesne assignments, to Eastman Kodak Company, Jersey City, N. J., a corporation of New Jersey No Drawing. Application July 25, 1932, Serial No. 624,652

4 Claims. (Cl. 260—42)

This invention relates to a process of dehydrating aqueous solutions of pyridine and its homologues and more particularly to a process in which such solutions are subjected to extraction with highly efficient extracting agents which are non-solvents with respect to water.

In the manufacture of certain organic compounds, notably mixed cellulose organic esters, pyridine is frequently used. It is also used as a solvent in the manufacture of numerous other cellulose derivatives. Under the usual conditions of operation involved in such processes, there is produced a relatively dilute aqueous solution containing pyridine as well as certain of its homologues, such as the picolines and lutidines. Inasmuch as pyridine is a relatively expensive material, its recovery in substantially anhydrous condition from these dilute solutions has become highly important. Many attempts have been made to recover this compound by simple distillation methods, but such efforts have proved unsuccessful due to the fact that pyridine which has a boiling point of 115° C., forms an azeotropic mixture with water containing 57% pyridine and boiling at 92.5° C. It was, therefore, necessary to determine some other recovery method and after an intensive study of this problem it was discovered that this desirable result could be accomplished by the process herein described.

The present invention may, therefore, be said to have as its principal object the provision of a process whereby substantially anhydrous pyridine may be recovered from its aqueous solutions. A further object is to provide a process wherein pyridine and its homologues may be obtained in substantially anhydrous form from aqueous solutions or mixtures thereof. A specific object is to provide a dehydrating process in which highly efficient extracting agents are employed.

These objects are accomplished by the following invention which in its broadest aspects comprises extraction of the aqueous solution of pyridine with an extractant which is an excellent solvent for pyridine and its homologues but is substantially a non-solvent with respect to water. After the extraction (which may be carried out in any convenient manner) is completed, the resulting extract is subjected to fractional distillation which completely removes the extractant and leaves the pyridine in substantially 100% anhydrous condition.

In the following examples and description I have set forth several of the preferred embodiments of my invention but they are included merely for purposes of illustration and not as a limitation thereof.

I have found that aqueous solutions of pyridine can be easily and cheaply dehydrated and recovered by extraction with any one of a number of solvents such as benzene, trichlorethylene, isopropyl ether, pseudo-cumene, cyclohexane, hexane, and the like. Of these extractants I have found trichlorethylene and benzene to have superior extracting qualities and especially satisfactory from the standpoint of freedom from hydrolysis or other undesirable reactions with the pyridine. Assuming the process to be carried out by employing benzene as the extractant, the aqueous pyridine solution is brought into intimate contact with the benzene, either by agitating a mixture of the liquids in a batch operation, or by passing them counter-currently through an appropriate column. In either case the benzene substantially completely dissolves the pyridine from its aqueous solution. The extract which is thus obtained is easily separated from the water due to the difference in density between extractant and extracted liquid. The extract is then submitted to fractional distillation which completely removes the benzene, leaving anhydrous pyridine as the final product.

Water is only very slightly soluble in benzene, but the presence of the pyridine in the benzene phase during extraction results in a relatively small amount of water being taken up by the benzene. Under the usual conditions prevailing in a batch operation as described below this will not run much over one or two per cent. The water thus carried over into the extract is completely removed, however, during the first part of the distillation because of the fact that the benzene and water form an azeotropic mixture containing about 8.8% water by weight and boiling at 69.25° C. It will thus be seen that the mixture of pyridine and benzene is completely dehydrated in the early stages of the distillation and that by the time the distillation is completed the benzene is completely removed, 100% anhydrous pyridine is left as the final product.

The same conditions as described in the previous paragraph prevail with respect to the use of the other extracting agents referred to above. For example, when using trichlorethylene, an extract is obtained consisting of pyridine dissolved in the trichlorethylene and containing a few percent of water. As in the case of benzene, the trichlorethylene forms an azeotropic mixture with water containing 6.8% water by weight and boiling at 72° C. When employing an excess of trichlorethylene, the extract is completely dehydrated in the early stages of the distillation because of the fact that the trichlorethylene-water azeotrope comes over first followed by the remainder of the trichlorethylene, thus leaving pure 100% anhydrous pyridine as the final product.

*Example I.*—1000 cc. of an aqueous solution containing 10% of pyridine is extracted with 500 cc. of commercial benzol. Analysis of the aqueous phase shows that the pyridine concentration has been reduced to 2½%. Again the water phase is extracted with 500 cc. of benzol and the pyridine concentration brought down to about 1%. A third extraction with 500 cc. of benzol brings the pyridine concentration in the aqueous layer down to about .5% or less. The resulting 1500 cc. of benzol containing pyridine is submitted to fractional distillation and the benzol, together with any water that may be dissolved, is easily distilled off, leaving practically pure pyridine.

*Example II.*—1000 cc. of a 9.2% aqueous pyridine solution were shaken with 1000 cc. of trichloroethylene. The mixture was allowed to settle, separated, and the water layer analyzed for pyridine content. It showed 2.1% pyridine remaining in the water. This was again shaken with 1000 cc. of trichloroethylene, allowed to settle and separated. The pyridine content of the water layer was thus reduced to .5%. The trichloroethylene extract consisting of about 2000 cc. was then fractionated to remove the trichloroethylene and leave substantially pure pyridine. As in the case of benzol, the small amount of water which may be dissolved in the trichloroethylene layer in the presence of pyridine, distills azeotropically with the trichloroethylene. Unlike most chlorinated hydrocarbons such as methylene chloride, trichloroethylene is not easily hydrolyzed by boiling in the presence of pyridine.

*Example III.*—1000 cc. of an aqueous solution of alpha-picoline containing 9.1% alpha-picoline is shaken with an equal volume of benzol. The layers are allowed to separate and the water layer is analyzed and found to contain only 1.5% alpha-picoline. This aqueous layer is extracted again with 1000 cc. of benzol and the concentration of alpha-picoline in the water layer is reduced to .4%. The benzol extract is then submitted to fractional distillation as in the preceding example, the benzol being distilled off leaving the alpha-picoline in a comparatively pure state.

*Example IV.*—1000 lbs. of a 10% aqueous solution of pyridine are extracted with 1000 lbs. of trichlorethylene employing a counter-current extracting apparatus of any well known type. The extraction is carried out in such a manner that the amount of water leaving the extractor carries with it a negligible amount of pyridine, say, for example, 1/10%. The trichlorethylene extract contains substantially all the pyridine originally present in the aqueous solution, together with a small amount of dissolved water which, in the present operation, is of the order of about 2%. The water leaving the extractor is run to waste, while the trichlorethylene extract is conveyed to a conventional type of distillation apparatus where it is rectified to produce substantially pure pyridine and pure trichlorethylene, the latter, of course, being returned to the extracting apparatus to act upon further portions of aqueous pyridine. The small amount of water which is dissolved in the trichlorethylene extract leaving the extractor is continuously removed from the top of the distillation column with the trichlorethylene. Substantially pure anhydrous pyridine is left in the still and may be continuously run to storage in any convenient manner.

As indicated by the above examples, my process may be carried out as a batch operation or as a continuous operation employing the counter-current principle of extraction. In commercial practice the latter method is preferred on account of its economy and ease of operation. It is, of course, to be understood that many changes in the details of carrying out my dehydration process may be made within the scope of my invention.

It will be apparent that the process herein described provides a highly efficient but simple means of recovering pyridine and its homologues from aqueous solutions thereof. It will be readily recognized by those skilled in the art that the extraction of pyridine presents numerous difficulties in view of the fact that not all of those substances which might ordinarily be considered effective extractants for this compound can be used because of undesirable reactions which occur. It has been found, for example, that numerous organic liquids, such as propylene chloride, ethylene chloride, and methylene chloride, which are good extractants for dissolving out the pyridine from its aqueous solutions are, nevertheless, unsatisfactory because of the fact that they hydrolyze in the presence of pyridine to form other compounds, propylene and ethylene chloride forming the corresponding glycols, and methylene chloride forming formaldehyde. As previously indicated, I have determined that benzene, trichlorethylene, and pseudo cumene, are excellent extractants and at the same time do not hydrolyze in the presence of pyridine. Many other extractants having similar properties may be used in place of the extractants herein specified. For the purpose of my invention, the extractant must be a good solvent with respect to pyridine and its homologues, but must at the same time be of such a nature that hydrolysis or other undesirable reactions tending to cut down the yield of pyridine will not occur.

As many apparently widely different embodiments of this invention may be made without departing from the spirit thereof, it is to be understood that I do not limit myself to the foregoing examples or description except as indicated in the following patent claims.

What I claim and desire to secure by Letters Patent of the United States is:

1. The method of dehydrating an aqueous solution of pyridine which comprises extracting the solution with pseudo-cumene, separating from the solution a water-immiscible extract of pyridine dissolved in pseudo-cumene, and distilling the pyridine from the pseudo-cumene.

2. The method of dehydrating an aqueous solution of an organic base selected from the group consisting of pyridine and its alkyl homologues, which comprises extracting the solution with pseudo-cumene, separating from the aqueous solution a water-immiscible extract of the base dissolved in pseudo-cumene and separating the base from the pseudo-cumene.

3. The method of dehydrating an aqueous solution of an organic base selected from the group consisting of pyridine and its alkyl homologues, which comprises extracting the solution with pseudo-cumene, separating from the aqueous solution a water-immiscible extract of the base dissolved in psuedo-cumene and separating the base from the psuedo-cumene by distillation.

4. The method of dehydrating an aqueous solution of pyridine, which comprises extracting the solution with pseudo-cumene, separating from the solution a water-immiscible extract of pyridine dissolved in pseudo-cumene and containing a small amount of water, removing the water from the extract by distilling therefrom an azeotropic mixture of pyridine and water, and then distilling the remainder of the pyridine from the pseudo-cumene.

WEBSTER E. FISHER.